United States Patent [19]

Goldman

[11] Patent Number: 4,587,652
[45] Date of Patent: May 6, 1986

[54] DATA CONTROL FOR TELEPHONE SYSTEM

[75] Inventor: Stuart O. Goldman, Columbus, Ohio

[73] Assignee: ITT Corporation, New York, N.Y.

[21] Appl. No.: 622,939

[22] Filed: Jun. 21, 1984

[51] Int. Cl.$^4$ ................................................ H04J 3/12
[52] U.S. Cl. ..................................... 370/110.1; 455/58
[58] Field of Search ............................ 455/33, 38, 58; 179/2 EB; 370/110.1; 340/825.5; 371/41

[56] References Cited

U.S. PATENT DOCUMENTS

| | | | |
|---|---|---|---|
| 4,144,409 | 3/1979 | Utano et al. | 179/2 EB |
| 4,144,412 | 3/1979 | Ito et al. | 455/33 |
| 4,144,496 | 3/1979 | Cunningham et al. | 455/33 |
| 4,242,538 | 12/1980 | Ito et al. | 179/2 EB |
| 4,352,955 | 10/1982 | Kai et al. | 179/2 EB |
| 4,475,010 | 10/1984 | Huensch et al. | 455/33 |
| 4,481,670 | 11/1984 | Freeburg | 455/33 |

*Primary Examiner*—Douglas W. Olms
*Assistant Examiner*—Kenneth I. Rokoff

*Attorney, Agent, or Firm*—John T. O'Halloran; Jeffrey P. Morris

[57] ABSTRACT

In a telephone system, particularly a mobile radio-telephone system, incorporating statistical multiplexers and control concentrators for the arranging and formatting of digitized data, the data is formatted with operational codes designating specific meaning and any one of a plurality of levels of protection to be offered data transmitted via the telephone system. A back-up memory is connected to the statistical multiplexer to enable a retransmission of a batch of data in the event that the batch had been received with error. Full duplex communication is provided. A circular sequence number interleaved among batches of the data is utilized by an error detector at a receiving site to determine the presence of all portions of a batch of data. Transmission of specified operational codes and additional data as required in the reverse direction commands a retransmission and also provides for acknowledgement of receipt of a data batch with and without error.

12 Claims, 4 Drawing Figures

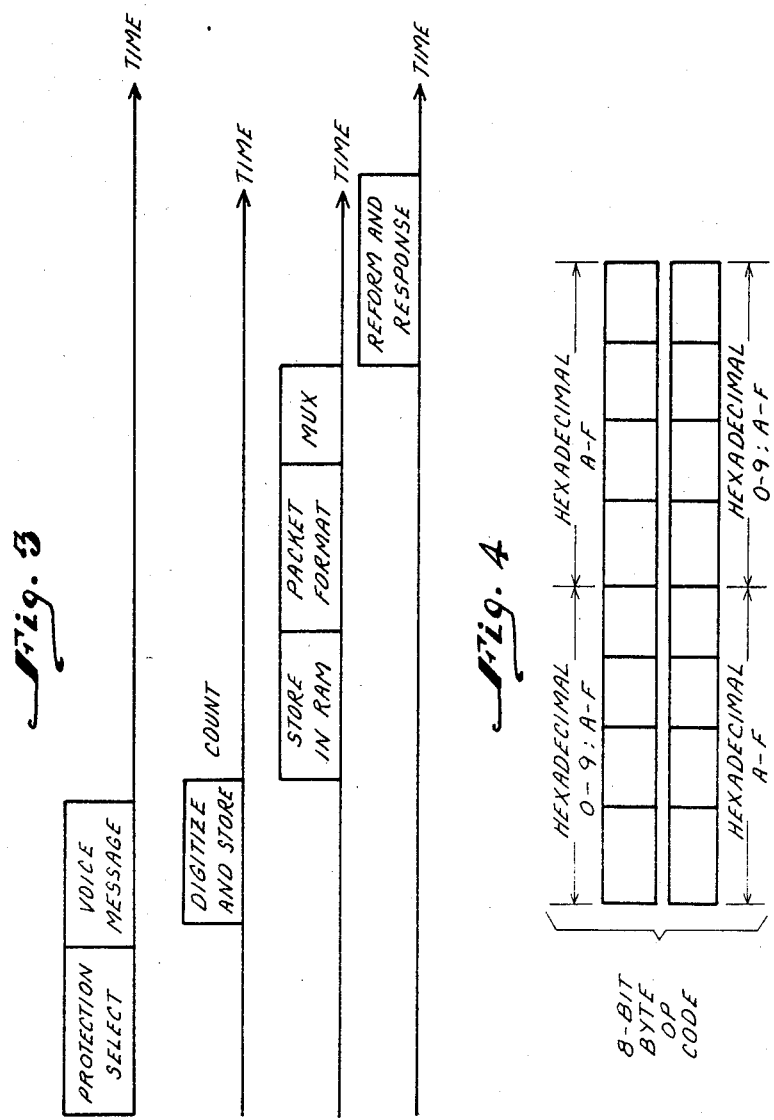

DATA CONTROL FOR TELEPHONE SYSTEM

BACKGROUND OF THE INVENTION

This invention relates to telephone systems and, more specifically, to a selective commanding of modes of data transmittal for protection of communications from data loss. The selection of the degree of protection is particularly useful in cellular mobile radio-telephone systems wherein it is frequently desirable to treat various communications, such as voice, vehicular registration, call event, and various types of control data at differing levels of priority.

A system of interest in understanding cellular mobile radio is disclosed in a U.S. patent application entitled "Cellular Mobile Radio Service Telephone System" of S. O. Goldman et al having Ser. No. 457,155, filed Jan. 11, 1983 and assigned to the assignee hereof, which application is incorporated by reference herein in its entirety.

Cellular radio-telephony is used at numerous sites in this country and overseas. Such a telephone system permits communication between two mobile telephone stations as well as between a mobile station and a fixed station.

Such systems are formed of clusters of cells wherein each cell is assigned to a predetermined set of voice frequency channels. The channels are spaced apart in the frequency spectrum so as to permit simultaneous transmission of many telephone conversations by many stations without interference between communications in the various channels. In order to insure that there is no interference between the assigned frequency channels of one cell and the assigned frequency channels of a contiguous cell, the channels in the contiguous cell are located at different portions of the frequency spectrum than the channels of the one cell. The same frequency channels are repeated at more remote cells, and the power of the signal transmission in any one channel is limited in amplitude so as to become attenuated to a sufficiently low, non-interfering level at the frequency channel of the remote cell.

Cellular mobile radio-telephone systems are described in the literature. One such system referred to as an "Advanced Mobile Phone Service" is described in *The Bell System Technical Journal,* January 1979, Vol. 58, No. 1, pp 1-269. Multiplexing of the cell site base transceivers and other equipment control links for individual subscriber channels for communication via RF (radio frequency) link is accomplished, preferably, by means of statistical multiplexers. Such multiplexers are described in an article entitled "Controlling Data Communications: Statistical Multiplexer Moves In" by H. J. Hindin in *Electronics* July 28, 1981, pp 141-148, and in "A Buyers Guide to Today's Volatile Statistical Multiplexers" by J. H. Sharen-Guivel and A. A. Calson in *Data Communications,* March 1982, pp. 97-126. A switching configuration for a mobile system is disclosed in "A Distributed Switching Approach to Cellular Coverage" by R. E. Pickett in *Telecommunications Magazine,* February, 1983. A network control system for use in cellular mobile radio-telephony may include the commercially available ITT System 1210 CELL-TREX hardware and software.

In the construction of a cellular system, a group of the foregoing cells is clustered about a system switching network which allocates the available frequency channels in any one cell among the various mobile radio-telephones with which communication is desired. Such switching networks provide for the coupling of a telephone conversation of one frequency channel in a first cell with a second frequency channel in a second cell or, alternatively, with a long distance trunk circuit which connects the first cell with a desired cell in another cluster or with a fixed station. In addition, well-known control circuitry is provided for the transmission of command signals to the mobile stations for directing their respective transmissions on the allocated frequency channels.

As a mobile station moves from one cell to the next cell, a hand-off procedure is followed wherein the central switching network commands the mobile station to switch frequency from the channel which was used in the first cell to the frequency of a new channel to be used in the second cell. A characteristic in hand-off decision-making circuitry presently in use is the measurement of the amplitude of or quality of signal transmission with the mobile station. The communication system may include directional antennas at each cell site, the antennas designating specific azimuthal sectors showing generally the position of a mobile station within a cell. The amplitude of or quality of the signal received from a mobile station varies with location of the station in the cell. Thus, the signal strength can serve as an indication that the mobile transmitter is centrally located within a cell, or is located near the boundary of the cell. Thereby, by monitoring the amplitude or quality of such signal transmissions the decision-making circuitry of the hand-off apparatus is able to signal the system switching network at the appropriate time when a hand-off is to be made from one frequency channel to another frequency channel.

It is recognized in telephonic communication that some messages need be transmitted with greater fidelity than others. Protection against errors can be provided by retransmission of a message in the event of an error in the original transmission. An acknowledgement of receipt also protects the sender from the possibility that a message has been missent.

A problem arises in that the foregoing forms of protection are time-consuming and would result, therefore, in reduced rate of transmission if applied generally to all messages. An occasional use of such protection procedures would not significantly reduce the overall data handling capacity of the telephone system. The problem is most significant in mobile telephony because additional data must be transmitted in addition to the usual voice communication such additional data including vehicle identification, channel frequency assignments during hand-off, and other control data as well as digitized data which might be transmitted between subscribers over a voice channel.

SUMMARY OF THE INVENTION

The foregoing problem is overcome and other advantages are provided by a telephone system incorporating statistical multiplexers and control concentrators for arranging and formatting digitized data for an optimal throughput rate and wherein, in accordance with the invention, operational (op) codes and circular sequence numbering are interleaved with batches of the data. The operational codes include commands for the level of protection desired.

In accordance with the invention, storage is provided for holding a batch of data to permit retransmission if necessary. Error detecting circuitry is provided for monitoring the sequence numbers to determine that a batch of data has been lost. Additional error detecting circuitry is provided for monitoring batch check points to determine that no segments of a batch of data has been lost or distorted. The control system is full duplex to permit transmission, back to the sender, of control communications indicating an error in the received message or acknowledging receipt of a correct message.

The operational codes are formatted as full-size bytes (typically 8 bits), this being the same size byte used in carrying the data. Use of a common sized word length for both data and control symbols facilitates the transmission of the encoded data via the statistical multiplexers, and also permits a more rapid decoding of the operational codes, thereby to provide fast error correction. In accordance with the commands of protection designated by the op code, the transmission from a sending telephone subscriber station to a receiver telephone subscriber station or from a cell site base and transceiver to the system controller can be accomplished with any one of three levels, namely, (1) no protection, (2) error detection plus repeated transmission, and (3) acknowledgement of receipt of error-free message. Levels (2) and (3) may be combined if desired. The desired level of protection is entered into the system at the time each op code is defined for both managing and protection level.

BRIEF DESCRIPTION OF THE DRAWING

The foregoing aspects and other features of the invention are explained in the following description taken in connection with the accompanying drawing wherein:

FIG. 3 is a timing diagram useful in explaining operation of the system of FIG. 2; and FIG. 4 shows an arrangement of an op code transmitted via the system of FIG. 1.

DETAILED DESCRIPTION

Figure 1:
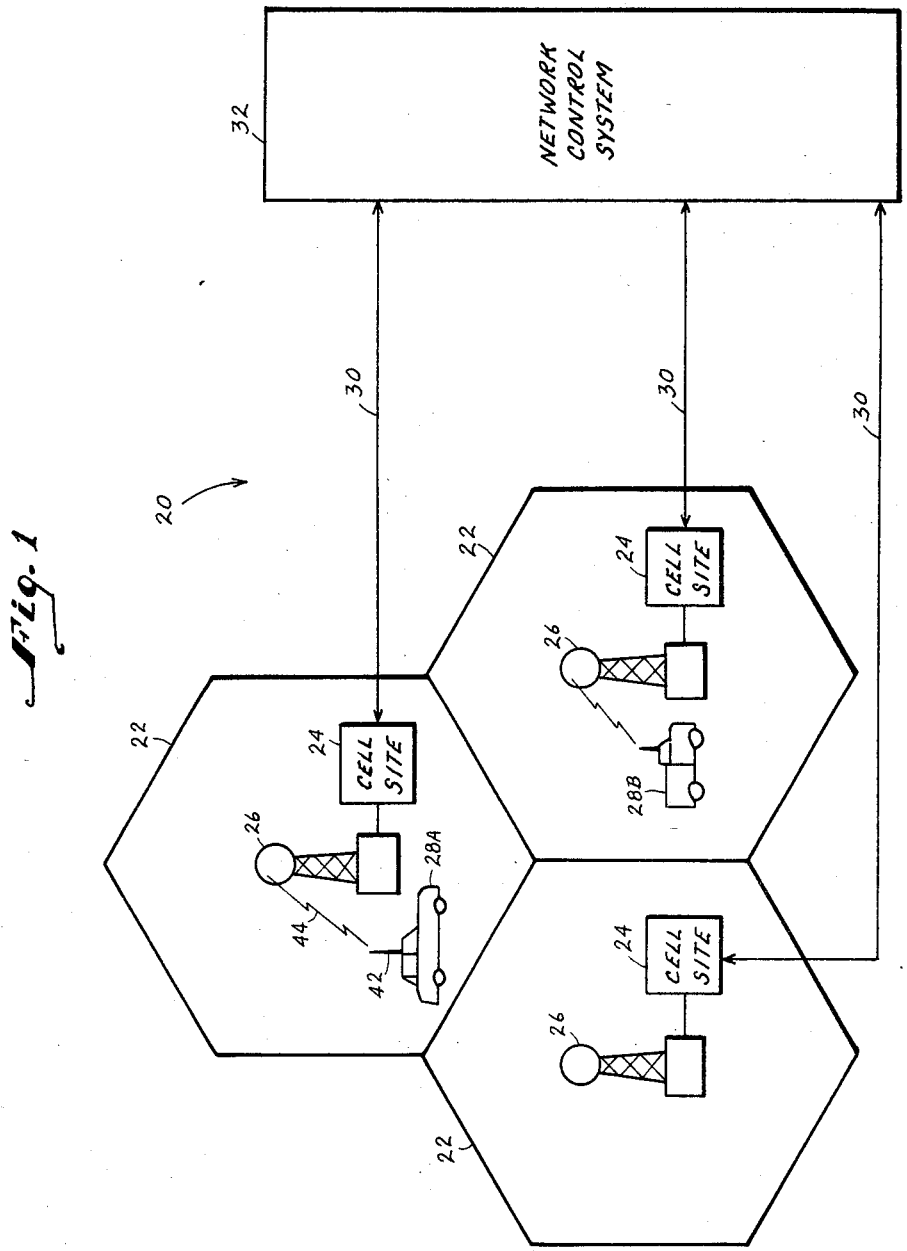
FIG. 1 is a diagrammatic view of a cellular mobile radio-telephone system incorporating the invention.

With reference to FIG. 1, a mobile radio-telephone system 20 is divided geographically into cells 22 each of which contains a cell site system 24 and an antenna 26. The antenna 26 connects with the cell site system 24 for transmission of signals between the system 24 and a mobile subscriber station 28, individual ones of the station 28 being further identified by the legends A and B when it is desired to designate a specific one of the stations, such a car 28A in one of the cells 22 and a truck 28 in another of the cells 22. Each of the cell site systems 24 is coupled by a link 30 to a network control system 32 which may be located at a site remote from the cells 22 and wherein the links 30 may be wire, cable, or radio as a design choice in the construction of the system 20. The antenna 26 is located usually at the center of a cell 22 so as to broadcast with substantial uniformity of signal strength at the boundaries of the cell 22, thereby to facilitate hand-off procedures of a mobile station 28 from one cell to another cell.

Figure 2:
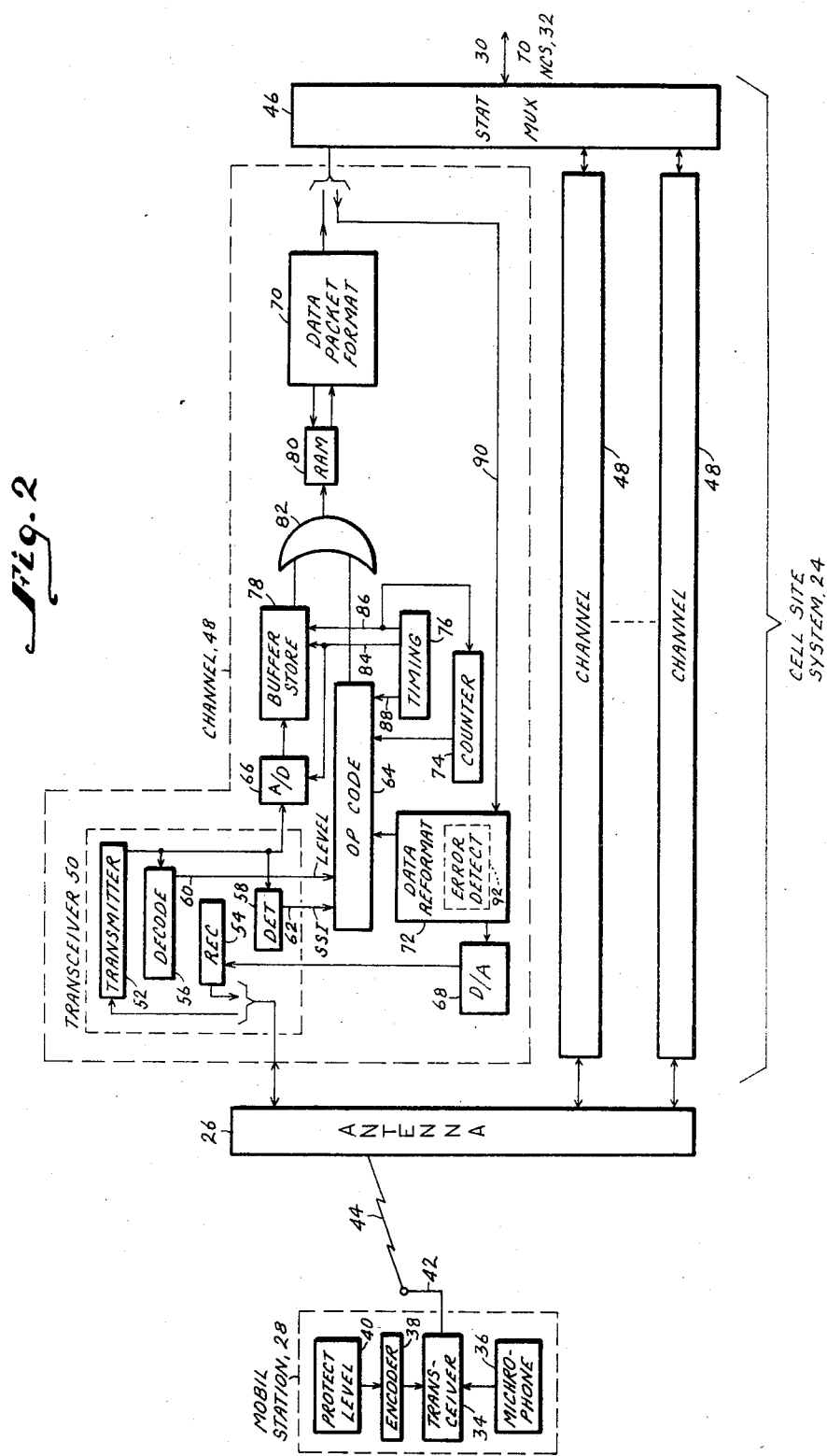
FIG. 2 is a block diagram showing electrical circuitry utilized in the practicing of the invention, the circuitry forming a part of individual ones of the cell site systems of FIG. 1.

With reference also to FIG. 2, there are shown further details of the mobile station 28 and the cell site system 24. The mobile station 28 includes a transceiver 34 connected to a microphone 36 for communication of a voice message. Also included within the mobile station 28 is an encoder 38 connected between the transceiver 34 and a data entry device 40 by which a person selects a desired level of protection or a message prior to communication of the message via the system 20. An antenna 42 connects with the transceiver 34 for communication of the voice and protection level via a radio link 44 between the two antennas 42 and 26.

The cell site system 24 comprises a statistical multiplexer 46 and a set of communication channels 48 coupled between the antenna 26 and the multiplexer 46. The multiplexer 46 is further coupled via the link 30 to the network control system 32. Each channel 48 includes a transceiver 50 which comprises a transmitter 52, a receiver 54, a decoder 56 and a detector 58. The transmitter 52 and the receiver 54 connect with the antenna 26, respectively, for the transmission and reception of communication of the station 28. The decoder 56 is coupled to the output terminal of the transmitter 52 for decoding the protection level code to provide a protection level request signal on line 60. The detector 58 is also coupled to the output terminal of the transmitter 52 for detection of the strength of the signal received via the radio link 44, the detector 58 providing a signal strength indication on line 62.

Each channel 48 further comprises a code unit 64 which provides operational (op) codes, analog-to-digital converters 66 and 68, a data packet formatting unit 70 and a data reforming unit 72, a counter 74, a timing unit 76, a buffer store 78, a random-access memory 80, and an OR gate 82.

In operation, voice signals received over the radio link 44 are amplified by the transmitter 52 and are applied via the converter 66 to the buffer store 78. The converter 66 converts the voice signals to digital format for storage within the store 78. Sampling by the converter 66 is understood to be accomplished at a rate at least twice the bandwidth of the voice signal to enable accurate reproduction of the voice signal. Clocking of the converter 66 and the inputting of the data samples to the store 78 is done in response to clock pulses provided on line 84 by the timing unit 76. The outputting of digital data samples from the store 78 is done in response to strobe signals on line 86 provided by the timing unit 76. The timing unit 76 also provides clock pulses via line 88 for operating the code unit 64.

The code unit 64 provides the requisite op codes in accordance with the level of protection of messages to be communicated via the system 20. The stored message in the store 78 and the op code of the code unit 64 are applied via the OR gate 82 to the memory 80. Thereupon, the format unit 70 extracts the data and code words in a desired order so as to arrange the data packet in a prescribed format for transmission via the statistical multiplexer 46 to the network control system 32. The format unit 70 comprises well known circuitry for interspersing control words or symbols with data words of a data stream. As indicated in FIG. 2, this is accomplished by sequentially addressing sequential portions of the data and control words in the memory 80 so as to provide the desired packet format.

In the situation wherein the desired level of protection employs circular sequence numbering, the counter 74 counts the output strobe signals on line 86 from the timing unit 76. Thereby, the count of the counter 74 indicates the location within the data bit stream. The count of the counter 74 is applied to the code unit 64 for entry of the circular sequence numbering as a part of the op code.

The code unit 64 is also utilized to provide other control words in addition to those required for the protection of the communication. By way of example, the signal strength indication on line 62 is employed to activate the code unit 64 to provide a hand-off command op code. The code unit 64 employs well-known circuitry as is customarily utilized in the development of op codes in telephonic communication systems. By way of example in the construction of such code circuitry, the code unit 64 may include a read-only memory (not shown) which is addressed by signals on the lines 60 and 62 for extracting the desired code words under command of the timing signals on line 88.

The resultant coded signals produced by any one of the channels 48 for any one of the mobile stations 28 are multiplexed at the multiplexer 46 with signals provided via other ones of the channels 48 corresponding to other ones of the mobile stations 28. Packets of the signals from the respective ones of the channels 48 are transmitted to the network control system 32 via the link 30 in the format of multiplexing. The network control system 32 then switches the signals from the respective channels 48 to other cell site systems 24 of the cells 22 wherein are found the stations 28 which are engaged in telephonic communication with the first-mentioned mobile stations 28. While the called party in the foregoing example is a mobile station, it is to be understood that any one of the called parties may also be a stationary station such as a subscriber's residence, business or other fixed site.

Assuming that both a calling subscriber or party and a called party are both mobile stations then, it is to be understood that each of the cell site systems 24 incorporates the equipment shown in FIG. 2. Accordingly, FIG. 2 may also be used to explain the operation of a channel 48 receiving a voice communication, or other form of data communciation, for a receiving mobile station 28.

The operation of the system of FIGS. 1 and 2 may be better understood with reference also to FIGS. 3 and 4. In the timing diagram of FIG. 3, the first graph shows the communication of the voice message. In the second graph of the diagram there is shown the digitizing and storing of the voice message, this accomplished by the converter 66 and the store 78. Thereafter, the protection code word and the voice communication are stored in the memory 80, as indicated in the third graph of the timing diagram. Thereafter, the data and control words are formatted in a packet and transmitted via the system 20 to another cell 22 or to another station 28 within the same cell 22. The transmission involves the multiplexing at the multiplexer 46 followed by transmission via the network control system 32 and back to a multiplexer 46 in the same cell or in another cell to be received by one of the channels 48. The formation of the packet, the multiplexing and demultiplexing are indicated also in the third graph. The received signal is coupled from the multiplexer 46 via line 90 and coupled to the reforming unit 72. The reforming unit 72 separates the data words from the control words, and applies the digitized data words to the converter 68 for conversion back to analog form. The analog form at the output of the converter 68 is applied to the receiver 54 which retransmits the received signal via the antenna 26 and the radio link 44 to the mobile station 28 for reception by the transceiver 34. The op code words which have been separated from the packet by the reforming unit 72 are applied to the code unit 64. Included within the reforming unit 72 is an error detector 92 comprising well known circuitry for the detection of the presence of the elements of the circular numerical sequence in the transmitted packet, the detector 92 signalling the code unit 64 of correct and erroneous transmissions of the data.

In accordance with a feature of the invention, the op code introduced by the code unit 64 has the form of an 8-bit byte disclosed in FIG. 4. The byte is divided in two halves. Each half is in hexadecimal form. Two arrangements are shown in FIG. 4. In the upper arrangement, the right half is reserved for only the six symbols A-F while the left half may have any one of the 16 symbols 0-9; A-F. In the lower arrangement, the right half may have any one of the 16 symbols while the left half is restricted to only the 6 letter symbols A-F. It is the letter symbols that activate the reforming unit 72, and identify the byte as being an op code. Accordingly, in the upper arrangement wherein the right hand half is presumed to occur first, the unit 72 responds to the 6 symbols followed by the 16 symbols for a total of 96 possible code words. With the lower arrangement, the reforming unit 72 responds to only the 6 letter symbols of the 16 symbols appearing in the initial half of the byte, this followed by the remaining 6 letter symbols of the second half of the byte for a total of 36 possible code words. With both arrangements of FIG. 4, there are, accordingly, 132 unique op codes.

One collection of the op codes corresponds to a communication designation having no additional levels of protection. A second collection of op codes corresponds to the case wherein a packet of data is to be retransmitted in the event that an error is detected. A third collection of op codes corresponds to the request that an acknowledgement be made in response to an error-free transmission. The reforming unit 72 detects the various op codes and, in response to the foregoing levels of protection, activates the code unit 64 to transmit a command to the memory 80 in the event that a retransmission of data is required. The memory 80 stores the data for a sufficient time after the initial transmission to allow for a retransmission if required. Also, the code unit 64 provides for the transmission of an op code back to the original caller from the mobile station 28 for notification that the message has been correctly received when such level of protection has been designated. Thereby, it is seen that the foregoing components of a channel 48 provides for the generation of the op codes and the formatting of the data to serve both the calling subscriber party as well as the called subscriber party or the cell site base transceiver and the system controller to accomplish the levels of protection to communication as designated.

In the transmission of each batch of data, the arrangement of the components of the batch is as follows. First an op code is transmitted. This is followed by the sequential number if such number is required by the level of protection desired. This is followed by data and finally by a checksum. The length of the communication may be variable, with the length being implied by the op code or specified by a byte containing the length directly or indirectly (eg: number of bytes or number of digits). Thereby, the receiving device can be preset by the op code to respond to the number of data bytes which are to be transmitted in the communication. The foregoing data, the sequential number, and the checksum are in four-bit BCD (binary coded decimal) like characters, with two characters per byte with any pattern not assigned by the produced collection of op codes. With reference to the foregoing description of the op codes, it is noted that the set of op codes is specific in that each op code contains one four-bit pattern which is not present in the BCD bit patterns which are employed for the remainder of the communication. Upon implementing the invention in the radio-telephone systems presently in use today, it is noted that the statistical multiplexer provides the function only of passing the bytes of the communication to the control concentrator without further processing of the data. The control concentrator is provided with the logic circuitry required for interpreting and generating communication actions. It is also noted that the hexadecimal value of the op code can be utilized for synchronization purposes; if a control concentrator or a transceiver were to lose byte synchronization within a communication, such synchronization can be regained at the beginning of the next communication by a locating of the hexadecimal value in the op code.

The checksum also plays a role in the level of protection selected for the communication. If the checksum is wrong, the receiving unit ignores the communication, in which case the communication would be retransmitted in the event that a higher level of protection has been selected.

By virtue of the system and methodology of the invention described above, various levels of protection can be provided to communications either among subscribers or for control of the system in a mobile radiotelephone system. The invention is readily incorporated into a system, such as those presently in use, without the necessity of any major modification of such systems. The use of operational codes having a format which readily distinguishes the code word from a data word facilitates detection and identification of the op code so as to readily permit extraction of the data from the communication.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a telephone system, a method of communicating digitized data comprising the steps of:

storing batches of said data from each of a plurality of subscriber stations or cell site base equipment and system control elements prior to transmission of individual batches of said data from a first site to a second site;

in each of said batches, counting segments of said data;

in each of said batches, combining an operational code with said data to provide formatted data, said code including sequencing legends interleaved between successive ones of said segments of data;

storing formatted data of each of said batches in a back-up memory;

multiplexing the formatted data;

transmitting the formatted data from said first site to said second site; and checking data received at said second site in accordance with one of a plurality of procedures designated by said operational code.

2. A method according to claim 1 further comprising the step of reformatting the formatted data to regenerate said digitized data.

3. A method according to claim 1 further comprising the step of selecting an operational code designating a checking procedure that is free of a further communication between said first site and said second site.

4. A method according to claim 1 further comprising the step of selecting an operational code designating a checking procedure comprising the steps of:

signalling said first site of an error in the formatted data received at said second site; and retransmitting formatted data from said back-up memory.

5. A method according to claim 1 further comprising the step of selecting an operational code designating a checking procedure comprising the steps of:

signalling said first site of an error in the formatted data received at said second site;

retransmitting formatted data from said back-up memory; and signalling said first site of a correct transmission.

6. A method according to claim 1 further comprising the step of selecting an operational code designating a checking procedure comprising the step of signalling said first site of a correct transmission.

7. A method according to claim 1 further comprising the step of converting analog voice signals received from a mobile subscriber station at said first site to said digitized data.

8. A method according to claim 7 further comprising the step of selecting an operational code at said mobile station.

9. A method according to claim 4 further comprising the steps of:

converting analog voice signals received from a mobile subscriber station at said first site to said digitized data; and selecting an operational code at said mobile station.

10. A method according to claim 5 further comprising the steps of:

converting analog voice signals received from a mobile subscriber station at said first site to said digitized data.

11. A method according to claim 1 further incorporating the step of selecting the operational code.

12. A method according to claim 11 wherein said code selecting step comprises:

establishing a digital byte having an even number of digits;

dividing said byte into a first half and a second half; and forming one of said halves as a hexadecimal word, and the other of said halves is restricted to the letters A-F.

* * * * *